(12) United States Patent
Liu et al.

(10) Patent No.: US 8,274,618 B2
(45) Date of Patent: Sep. 25, 2012

(54) PIXEL STRUCTURE AND PIXEL ARRAY

(75) Inventors: Yen-Chi Liu, Taipei (TW); Yao-Li Cheng, Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 186 days.

(21) Appl. No.: 12/915,035

(22) Filed: Oct. 29, 2010

(65) Prior Publication Data

US 2012/0050656 A1    Mar. 1, 2012

(30) Foreign Application Priority Data

Aug. 31, 2010   (TW) ................................ 99129266 A

(51) Int. Cl.
*G02F 1/1343* (2006.01)
(52) U.S. Cl. .......................................... 349/39; 349/144
(58) Field of Classification Search ................. 349/144
See application file for complete search history.

(56) References Cited

FOREIGN PATENT DOCUMENTS

TW    200816486    4/2008

*Primary Examiner* — Phu Vu
(74) *Attorney, Agent, or Firm* — Jianq Chyun IP Office

(57) ABSTRACT

A pixel structure and a pixel array including the same are provided. The pixel structure includes a scan line, a capacitor electrode, a data line, an active device, and a pixel electrode. The capacitor electrode is electrically independent from the scan line and includes a first portion and at least one second portion. The first portion and the second portion extend in different directions, and an extending direction of the first portion is substantially the same as an extending direction of the scan line. The data line and the scan line are intersected with each other and electrically independent from each other. The data line is overlapped with the second portion of the capacitor electrode. The active device is electrically connected to the scan line and the data line. The pixel electrode is electrically connected to the active device and covers the data line and the capacitor electrode.

18 Claims, 4 Drawing Sheets

PIXEL STRUCTURE AND PIXEL ARRAY

CROSS-REFERENCE TO RELATED APPLICATION

This application claims the priority benefit of Taiwan application serial no. 99129266, filed on Aug. 31, 2010. The entirety of the above-mentioned patent application is hereby incorporated by reference herein and made a part of this specification.

BACKGROUND OF THE INVENTION

1. Field of the Invention

The invention relates to a pixel structure and a pixel array. More particularly, the invention relates to a pixel structure having a high display aperture ratio and a pixel array.

2. Description of Related Art

Nowadays, multimedia technologies have been well developed, which mostly benefits from the advancement of semiconductor devices and display apparatuses. As for displays, liquid crystal displays (LCDs) with superior features, such as high definition, great space utilization, low power consumption, and no radiation, have gradually become the mainstream of the market.

In general, an LCD is mainly comprised of an active device array substrate, an opposite substrate, and a liquid crystal layer sandwiched between the two substrates. To resolve the viewing angle issue arisen from the large-size display, continuous progress and breakthroughs in wide viewing angle technology of the LCD panel are required. A polymer stabilized vertical alignment (PSVA) LCD panel to which the wide viewing angle technology is applied has been extensively utilized in various electronic products.

Currently, data lines and pixel electrodes are alternately arranged in the pixel structure of the PSVA LCD panel. That is to say, different pixel electrodes are disposed in respective sides of each data line. Under said arrangement, a certain distance must exist between the data lines and the pixel electrodes, so as to prevent display dark stripes caused by uneven alignment or crosstalk phenomenon. In other words, the distance between the adjacent pixel electrodes at least exceeds individual line width of the data lines. Accordingly, the display aperture ratio of the entire panel is restricted.

SUMMARY OF THE INVENTION

The invention is directed to a pixel structure in which a pixel electrode covers the corresponding data line to comply with the requirement for the high display aperture ratio.

The invention is further directed to a pixel array in which a short distance exists between two adjacent pixel electrodes, which is conducive to compliance with the requirement for the high display aperture ratio.

The invention provides a pixel structure that includes a scan line, a capacitor electrode, a data line, an active device, and a pixel electrode. The capacitor electrode is electrically independent from the scan line and includes a first portion and at least one second portion. An extending direction of the first portion is different from an extending direction of the second portion, and the extending direction of the first portion is substantially the same as an extending direction of the scan line. The data line and the scan line are intersected with each other and electrically independent from each other. The data line is overlapped with the second portion of the capacitor electrode. The active device is electrically connected to the scan line and the data line. The pixel electrode is electrically connected to the active device and covers the data line and the capacitor electrode.

According to an embodiment of the invention, the first portion and the second portion of the capacitor electrode are connected, and the first portion and the second portion divide the pixel electrode into four alignment regions. The first portion and the second portion are connected in a cross-like shape, for instance. According to an embodiment of the invention, areas of the four alignment regions are approximately the same.

According to an embodiment of the invention, the pixel electrode further covers the scan line. When the number of the at least one second portion is two, one of two second portions is connected to the first portion, and the scan line and the two second portions divide the pixel electrode into four alignment regions. According to an embodiment of the invention, areas of the four alignment regions are approximately the same.

According to an embodiment of the invention, the pixel electrode has a plurality of alignment slits.

According to an embodiment of the invention, the data line is substantially located on a center line of the pixel electrode.

According to an embodiment of the invention, line width of the second portion is substantially greater than line width of the data line.

The invention further provides a pixel array that includes a plurality of said pixel structures. Here, a distance exists between the adjacent pixel electrodes along extending directions of the scan lines.

According to an embodiment of the invention, the distance is shorter than or equal to individual line width of the data lines.

Based on the above, in the invention, the data line and the capacitor electrode in the pixel structure are overlapped and located at the center of a region, and the region is covered by the pixel electrode. In the extending directions of the scan lines, it is not necessary to reserve space between the adjacent pixel electrodes for the data lines. Thereby, the distance between the adjacent pixel electrodes can be reduced, so as to increase the area where the pixel electrodes are placed. As such, the pixel array formed by the aforesaid pixel structures can have the high display aperture ratio. In addition to an increase in the aperture ratio, liquid crystal molecules at the edge of the pixel electrodes can be stably arranged, such that dark stripes are less likely to be generated, and that the light transmission rate can be increased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
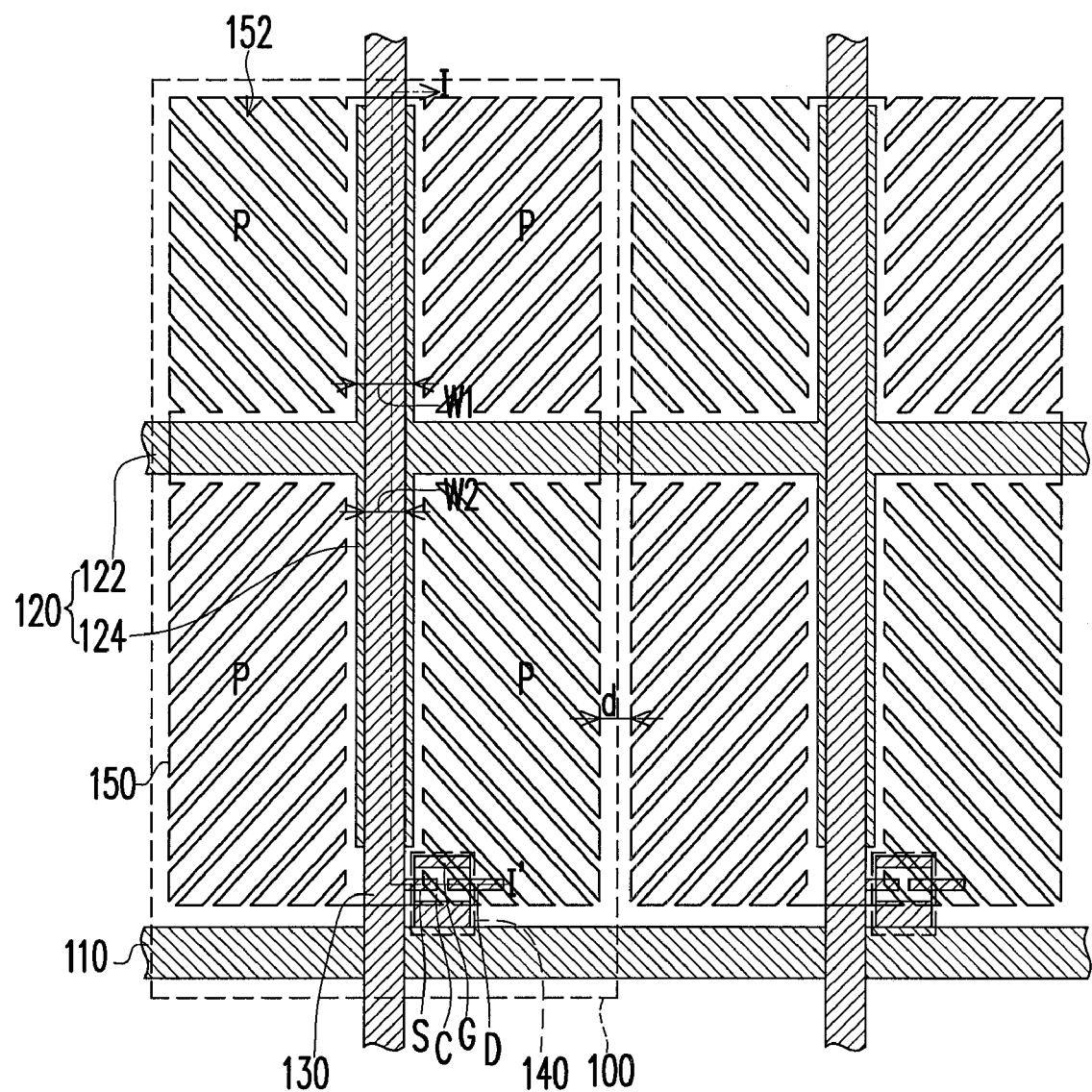
FIG. 1 illustrates a pixel array formed by two pixel structures according to an embodiment of the invention.

FIG. 1 illustrates a pixel array formed by two pixel structures according to an embodiment of the invention. With reference to FIG. 1, the pixel array 1000 includes a plurality of pixel structures 100 arranged in array. In this embodiment, the two pixel structures 100 are arranged in parallel to form the pixel array 1000, which should not be construed as a limitation to the invention. According to other embodiments, the adjacent pixel structures 100 in the pixel array 1000 can be arranged in a staggered manner or in a delta manner. That is to say, the two adjacent pixel structures 100 can be aligned to the same straight line or arranged in a stepped manner.

Each of the pixel structures 100 includes a scan line 110, a capacitor electrode 120, a data line 130, an active device 140, and a pixel electrode 150. The capacitor electrode 120 is electrically independent from the scan line 110 and includes a first portion 122 and a second portion 124. The first portion 122 and the second portion 124 extend in different directions, and an extending direction of the first portion 122 is substantially the same as an extending direction of the scan line 110. The data line 130 and the scan line 110 are intersected with each other and electrically independent from each other. The data line 130 is overlapped with the second portion 124 of the capacitor electrode 120. The active device 140 is electrically connected to the scan line 110 and the data line 130. The pixel electrode 150 is electrically connected to the active device 140 and covers the data line 130 and the capacitor electrode 120.

In this embodiment, the first portion 122 and the second portion 124 of the capacitor electrode 120 are connected to each other, and the first portion 122 and the second portion 124 divide the pixel electrode 150 into four alignment regions P. It can be learned from FIG. 1 that the first portion 122 and the second portion 124 that have different extending directions are connected in a cross-like shape, for instance. Besides, the pixel electrode 150 has a plurality of alignment slits 152. In the same alignment region P, extending directions of the alignment slits 152 are substantially parallel, and the alignment slits 152 in the adjacent alignment regions P extend along different directions. The pixel structure 100 can then have four alignment regions P with different alignment directions.

Specifically, the pixel array 1000 can be applied to a PSVA LCD panel. In other words, the alignment slits 152 are formed for alignment, and thereby the LCD panel can achieve the wide viewing angle display effect. According to an embodiment, areas of the four alignment regions P can be substantially the same, such that similar display effects can be accomplished at different viewing angles. Namely, in this embodiment, the data line 130 can be substantially located on a center line of the pixel electrode 150. Here, the second portion 124 of the capacitor electrode 120 is located on the center line of the pixel electrode 150 as well, and the intersection of the first portion 122 and the second portion 124 is at the center of the pixel electrode 150, for instance.

However, the areas of the four alignment regions P are not necessarily the same in this invention. In an embodiment of the invention, it is likely for the data line 130 not to be located on the center line of the pixel electrode 150. Certainly, the intersection of the first portion 122 and the second portion 124 of the capacitor electrode 120 can be located either at the center of the pixel electrode 150 or not at the center of the pixel electrode 150. Where the data line 130 and the capacitor electrode 120 are arranged can be appropriately adjusted based on different requirements, so as to obtain the desired arrangement of the alignment regions P.

In this embodiment, line width W1 of the second portion 124 is substantially greater than line width W2 of the data line 130. Thanks to the coupling between the second portion 124 of the capacitor electrode 120 and the data line 130, the impact on the voltage of the pixel electrode 150, which is arisen from electronic signals transmitted through the data line 130, can be alleviated. That is to say, crosstalk phenomenon caused by the data line 130 can be mitigated by adequately expanding the line width W1 of the second portion 124.

In general, the scan line 110, the capacitor electrode 120, and the data line 130 are non-light-transmissive elements in the pixel structure 100. Hence, the second portion 124 of the capacitor electrode 120 can be overlapped with the data line 130 in this embodiment, so as to reduce the area where the non-light-transmissive elements are disposed. The pixel structure 100 can then have the ideal (high) display aperture ratio. On the other hand, the pixel electrode 150 of this embodiment covers the data line 130 and crosses over the data line 130 in the width direction of the data line 130. As such, it is not necessary to reserve space between the adjacent pixel electrodes 150 for the data line 130, and the display aperture ratio of the entire pixel array 1000 can be further improved. In particular, a distance d between two adjacent pixel electrodes 150 is not greater than the line width W2 of the scan line 130.

Figure 2:
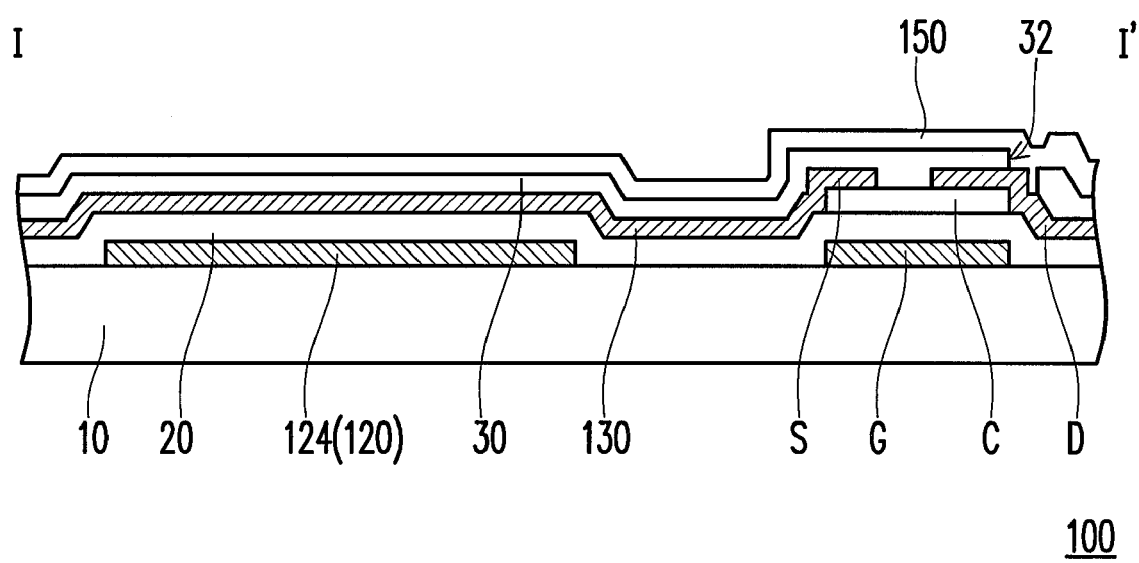
FIG. 2 is a schematic cross-sectional view illustrating the pixel structure that is depicted in FIG. 1 and taken alone a line segment I-I'.

To be more specific, please refer to FIG. 2, which is a schematic cross-sectional view illustrating the pixel structure that is depicted in FIG. 1 and taken alone a line segment I-I'. With reference to FIG. 1 and FIG. 2, the pixel structure 100 is substantially arranged on a substrate 10. The pixel structure 100 further includes an insulating layer 20 and an insulating layer 30 that are disposed between other elements.

In detail, the active device 140 includes a gate G, a channel layer C, a source S, and a drain D, for instance. According to this embodiment, the scan line 110, the gate G, and the capacitor electrode 120 can be formed by the same conductive material layer, for instance. Therefore, the second portion 124 of the capacitor electrode 120 and the gate G are substantially located in the same layer on the substrate 10, as shown in the cross-sectional view of FIG. 2. The insulating layer 20 covers the gate G and the second portion 124. It should be mentioned that the insulating layer 20 also covers the scan line 110 and the first portion 122 in the non-illustrated cross-section.

The channel layer C is disposed on the insulating layer 20 and located above the gate G. The gate G of this embodiment is an element extending from the scan line 110. However, the channel layer C in other embodiments can be directly disposed above the scan line 110, such that a portion of the scan line 110 can serve as the gate G.

Both the source S and the drain D are located above the channel layer C and disposed at respective sides of the gate G. The source S is substantially connected to the data line 130, and the data line 130 is disposed on the insulating layer 20. Namely, the data line 130, the source S, and the drain D are substantially formed by the same conductive material layer. The insulating layer 30 is disposed on the data line 130, the source S, and the drain D, and the insulating layer 30 has a contact opening 32. The pixel electrode 150 is disposed on the insulating layer 30 and electrically connected to the drain D through the contact opening 32.

In this embodiment, the bottom-gate amorphous silicon thin film transistor (TFT) acts as the active device 140. Note that the active device 140 can also have a top-gate design.

Common active devices in this field, such as a polysilicon TFT, an organic TFT, and so on, can all act as the active device 140.

It can be observed from FIG. 1 and FIG. 2 that the data line 130 of this embodiment is covered by the pixel electrode 150 and sandwiched between the pixel electrode 150 and the second portion 124 of the capacitor electrode 120. In said design, the non-light-transmissive elements can be overlapped, so as to increase the display aperture ratio of the pixel structure 100 and the pixel array 1000. Particularly, in the extending direction of the scan line 110, the distance d between two adjacent pixel electrodes 150 can be shorter than or equal to the line width W2 of the data line 130.

Additionally, the insulating layers 20 and 30 in this embodiment can be made of different insulating materials based on different requirements. Thickness of the insulating layers 20 and 30 can be properly increased, so as to mitigate coupling among different elements. For instance, the insulating layer 30 can be an organic insulating layer or a planarization layer, and the crosstalk phenomenon between the data line 130 and the pixel electrode 150 can be further weakened by increasing the thickness of the insulating layer 30. Thereby, the voltage of the pixel electrode 150 is not apt to be affected by signals on the data line 130. The pixel structure 100 can then have the ideal display quality and the high display aperture ratio.

Figure 3:
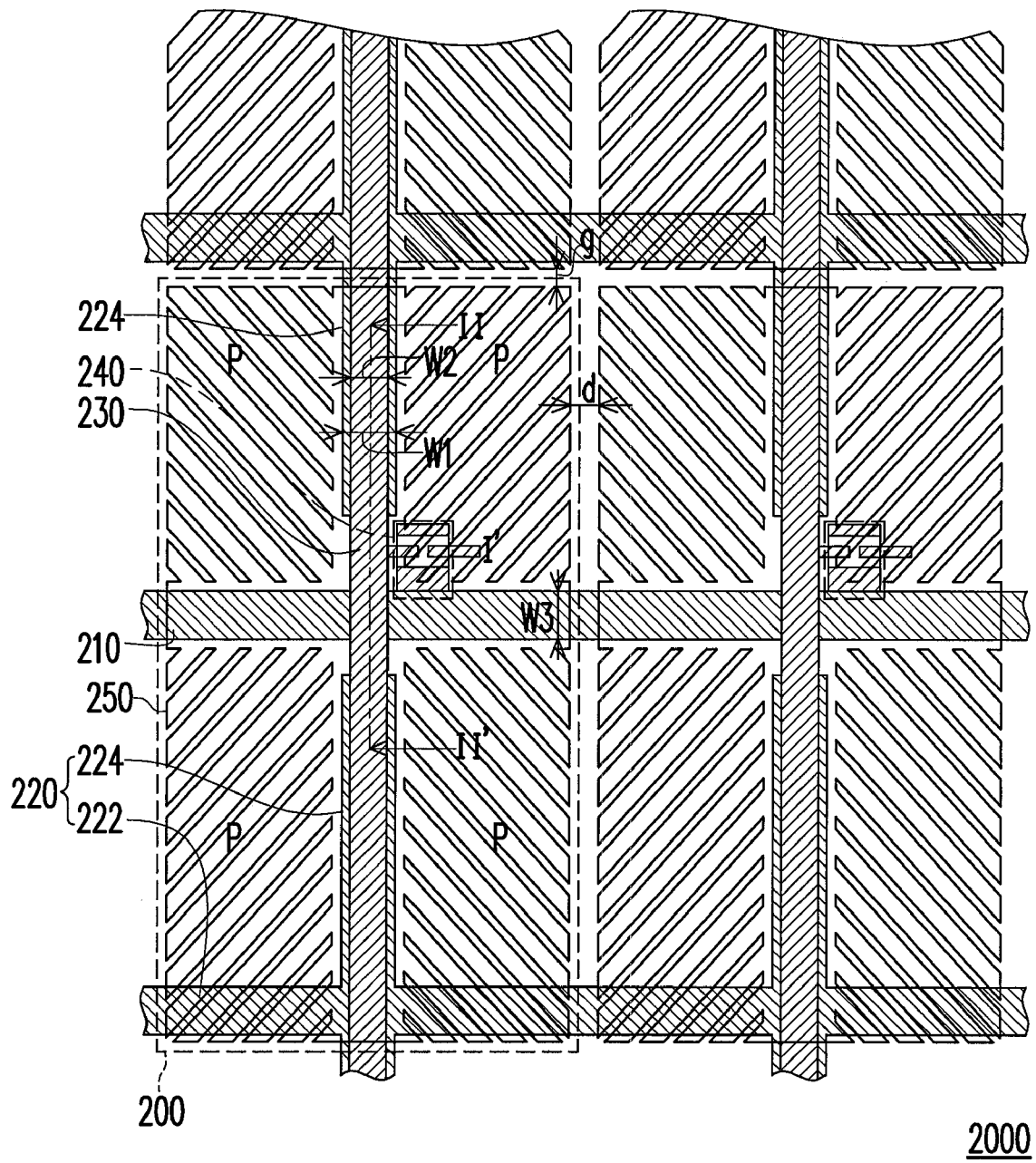
FIG. 3 is a schematic view illustrating a pixel array according to another embodiment of the invention.

It is noted that the design of the pixel structure is not limited to the above. FIG. 3 is a schematic view illustrating a pixel array according to another embodiment of the invention. With reference to FIG. 3, the pixel array 2000 includes a plurality of pixel structures 200 arranged in array. In this embodiment, the pixel structures 200 can be arranged in a row-column matrix manner or in a delta manner.

Each of the pixel structures 200 includes a scan line 210, a capacitor electrode 220, a data line 230, an active device 240, and a pixel electrode 250. The capacitor electrode 220 is electrically independent from the scan line 210 and includes a first portion 222 and two second portions 224. The first portion 222 and the second portions 224 extend in different directions, and an extending direction of the first portion 222 is substantially the same as an extending direction of the scan line 210. The data line 230 and the scan line 210 are intersected with each other and electrically independent from each other. The data line 230 is overlapped with the second portions 224 of the capacitor electrode 220. The active device 240 is electrically connected to the scan line 210 and the data line 230. The pixel electrode 250 is electrically connected to the active device 240 and covers the data line 230 and the capacitor electrode 220.

The difference between this embodiment and the previous embodiment lies in that the capacitor electrode 220 of this embodiment has two separate second portions 224, and that the scan line 210 in each pixel structure 200 of this embodiment is covered by the pixel electrode 250. Specifically, one of the two second portions 224 is connected to the first portion 222 and located at one side of the scan line 210, while the other one of the two second portions 224 is located at the other side of the scan line 210. Besides, the scan line 210 and the two second portions 224 divide the pixel electrode 250 into four alignment regions P, i.e., the scan line 210 and the data line 230 divide the pixel electrode 250 into four alignment regions P. In this embodiment, the alignment slits are not particularly marked in FIG. 3 for the purpose of clear illustration. When the pixel array 2000 is applied to the PSVA LCD panel, the wide viewing angle display function can be accomplished by forming the alignment regions P with different alignment directions.

According to an embodiment of the invention, areas of the four alignment regions P are approximately the same. Hence, the intersection of the scan line 210 and the data line 230 in each pixel structure 200 can be located at the center of the pixel electrode 250. Certainly, based on different design requirements, it is likely for the intersection of the scan line 210 and the data line 230 not to be located at the center of the pixel electrode 250, and the areas of the four alignment regions P are different.

It should be mentioned that individual line width W1 of the second portions 224 is greater than the line width W2 of the data line 230. Thus, the signals on the data line 230 are coupled to the second portions 224, such that the voltage on the pixel electrode 250 is less likely to be affected. As a result, the voltage on the pixel electrode 230 is not apt to float in the event of the crosstalk phenomenon. In other words, the pixel structure 200 can have constant display quality.

In the design of this embodiment, the light-shielding elements, i.e., the data line 230 and the second portion 224, are overlapped to reduce the light-shielding area. The pixel structure 200 can then have the ideal display aperture ratio. Further, in the extending direction of the scan line 210, the distance d between two adjacent pixel electrodes 250 can be shorter than or equal to the line width W2 of the data line 230. Consequently, the area where the pixel electrodes 250 are located in the pixel array 2000 can be expanded, so as to improve the display aperture ratio.

To be more specific, the scan line 210 and the first portion 222 are covered by the pixel electrode 250 in this embodiment. Therefore, in the extending direction of the data line 230, a distance g between two adjacent pixel electrodes 250 can be shorter than or equal to the line width W3 of the scan line 210. Consequently, the area where the pixel electrodes 250 are located in the pixel array 2000 can be expanded, so as to improve the display aperture ratio.

Figure 4:
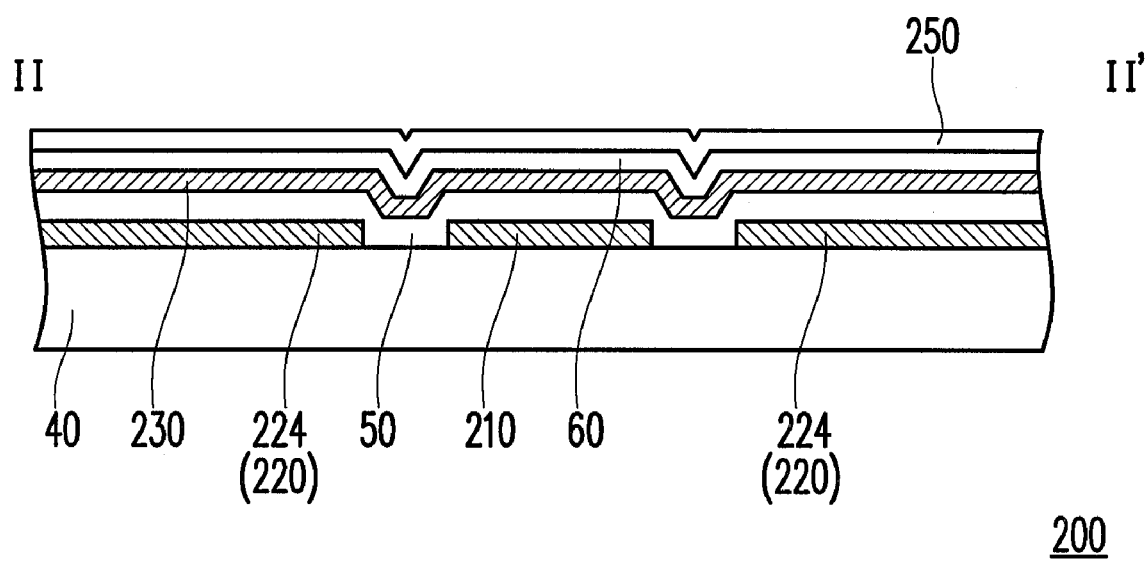
FIG. 4 is a schematic cross-sectional view illustrating the pixel structure that is depicted in FIG. 3 and taken alone a line segment II-II'.

FIG. 4 is a schematic cross-sectional view illustrating the pixel structure that is depicted in FIG. 3 and taken alone a line segment With reference to FIG. 3 and FIG. 4, the pixel structure 200 is disposed on a substrate 40 and includes an insulating layer 50 and an insulating layer 60. The substrate 40 holds elements, and the insulating layers 50 and 60 separate the elements. As such, the scan line 210, the data line 230, and the capacitor electrode 220 are not electrically connected to one another. The detailed arrangement of the substrate 40 and the insulating layers 50 and 60 can refer to the description in the previous embodiments. Note that the thickness of the insulating layers 50 and 60 can be selectively increased, so as to mitigate the crosstalk effect on the elements.

It should be mentioned that the scan line 210 in each pixel structure of this embodiment is disposed within the area where the pixel electrode 250 is located, and therefore the pixel electrode 250 covers the scan line 210. Besides, the data line 230 and the second portion 224 in each pixel structure are both covered by the pixel electrode 250. Hence, it is not necessary to reserve space between the adjacent pixel electrodes 250 for the scan line 210 or the data line 230, and the area where the pixel electrodes 250 are located can be expanded. On the other hand, the data line 230 and the second portion 224 are overlapped; therefore, the area of the light-shielding elements is significantly reduced, and the pixel structure 200 can have favorable display aperture ratio.

In light of the foregoing, the light-shielding elements are overlapped in this invention, which is conducive to improvement of the display aperture ratio. To be more specific, the data line and a portion of the capacitor electrode are overlapped in each pixel structure, such that the area where the pixel electrode is located is increased. Moreover, in the extending direction of the scan line, the distance between the adjacent pixel electrodes can be shorter than or equal to the line width of the data line. As such, the pixel array can have the high display aperture ratio. On the other hand, an overlapping portion of the capacitor electrode and the data line can be wider than the data line, and thereby the crosstalk effect on the pixel electrode by the data line can be mitigated. That is to say, the pixel structure and the pixel array of this invention can have not only the high display aperture ratio but also the ideal display quality.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A pixel structure comprising:
    a scan line;
    a capacitor electrode electrically independent from the scan line, the capacitor electrode comprising a first portion and at least one second portion, an extending direction of the first portion being different from an extending direction of the at least one second portion, the extending direction of the first portion being substantially the same as an extending direction of the scan line;
    a data line intersected with the scan line, the data line being electrically independent from the scan line and overlapped with the at least one second portion of the capacitor electrode;
    an active device electrically connected to the scan line and the data line; and
    a pixel electrode electrically connected to the active device and covering the data line and the capacitor electrode.

2. The pixel structure as claimed in claim 1, wherein the first portion and the at least one second portion of the capacitor electrode are connected, and the first portion and the at least one second portion divided the pixel electrode into four alignment regions.

3. The pixel structure as claimed in claim 2, wherein the first portion and the at least one second portion are connected in a cross-like shape.

4. The pixel structure as claimed in claim 2, wherein areas of the four alignment regions are approximately the same.

5. The pixel structure as claimed in claim 1, wherein the pixel electrode further covers the scan line.

6. The pixel structure as claimed in claim 5, wherein a number of the at least one second portion is two, one of two second portions is connected to the first portion, and the scan line and the two second portions divide the pixel electrode into four alignment regions.

7. The pixel structure as claimed in claim 6, wherein areas of the four alignment regions are approximately the same.

8. The pixel structure as claimed in claim 1, wherein the pixel electrode has a plurality of alignment slits.

9. The pixel structure as claimed in claim 1, wherein the data line is substantially located on a center line of the pixel electrode.

10. The pixel structure as claimed in claim 1, wherein a line width of the at least one second portion is substantially greater than a line width of the data line.

11. A pixel array comprising:
    a plurality of pixel structures, each of the pixel structures comprising:
        a scan line;
        a capacitor electrode electrically independent from the scan line, the capacitor electrode comprising a first portion and at least one second portion, an extending direction of the first portion being different from an extending direction of the at least one second portion, the extending direction of the first portion being substantially the same as an extending direction of the scan line;
        a data line intersected with the scan line, the data line being electrically independent from the scan line and overlapped with the at least one second portion of the capacitor electrode;
        an active device electrically connected to the scan line and the data line; and
        a pixel electrode electrically connected to the active device and covering the data line and the capacitor electrode,
    wherein a distance is between the pixel electrodes adjacent to each other in extending directions of the scan lines.

12. The pixel array as claimed in claim 11, wherein the distance is shorter than or equal to individual line width of the data lines.

13. The pixel array as claimed in claim 11, wherein the first portion and the at least one second portion of the capacitor electrode are connected, and the first portion and the at least one second portion divide the pixel electrode into four alignment regions.

14. The pixel array as claimed in claim 13, wherein the first portion and the at least one second portion are connected in a cross-like shape.

15. The pixel array as claimed in claim 13, wherein areas of the four alignment regions are approximately the same.

16. The pixel array as claimed in claim 11, wherein the pixel electrode further covers the scan line.

17. The pixel array as claimed in claim 16, wherein the number of the at least one second portion is two, one of two second portions is connected to the first portion, and the scan line and the two second portions divide the pixel electrode into four alignment regions.

18. The pixel array as claimed in claim 16, wherein areas of the four alignment regions are approximately the same.

* * * * *